(12) United States Patent
Halaharivi et al.

(10) Patent No.: US 12,086,412 B2
(45) Date of Patent: Sep. 10, 2024

(54) BALANCING PERFORMANCE BETWEEN INTERFACE PORTS IN A MEMORY SUB-SYSTEM

(71) Applicant: Micron Technology, Inc., Boise, ID (US)

(72) Inventors: Raja V. S. Halaharivi, Gilroy, CA (US); Prateek Sharma, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 24 days.

(21) Appl. No.: 17/900,120

(22) Filed: Aug. 31, 2022

(65) Prior Publication Data
US 2024/0069732 A1   Feb. 29, 2024

(51) Int. Cl.
G06F 3/06     (2006.01)
(52) U.S. Cl.
CPC ............ *G06F 3/061* (2013.01); *G06F 3/0629* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2013/0285633 A1* | 10/2013 | Johnson | H02M 1/08 323/282 |
| 2017/0228330 A1* | 8/2017 | Huang | G06F 13/4081 |
| 2022/0092203 A1* | 3/2022 | Khatri | G06F 3/061 |
| 2022/0276687 A1* | 9/2022 | Truong | G06F 1/3296 |
| 2022/0353001 A1* | 11/2022 | Hu | H04L 25/4908 |
| 2023/0244614 A1* | 8/2023 | Benisty | G06F 13/1668 710/107 |

* cited by examiner

*Primary Examiner* — Danny Chan
(74) *Attorney, Agent, or Firm* — Lowenstein Sandler LLP (57) ABSTRACT

A system includes a memory device, a first interface port and a second interface port operatively coupled with the memory device, and a processing device, operatively coupled with the memory device, to perform operations including: detecting a triggering event associated with the first interface port; responsive to detecting the triggering event, sending an interrupt message to a firmware component of the memory device; receiving, from the firmware component, a configuration setting based on the interrupt message; and allocating, by the processing device, one or more resources to the first interface port according to the configuration setting.

20 Claims, 5 Drawing Sheets

BALANCING PERFORMANCE BETWEEN INTERFACE PORTS IN A MEMORY SUB-SYSTEM

TECHNICAL FIELD

Embodiments of the disclosure relate generally to memory sub-systems, and more specifically, relate to balancing performance between interface ports in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to balancing performance between interface ports in a memory sub-system. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

In certain memory sub-systems, an interface port can be used to transmit data between the memory sub-system and one or more host systems. The interface port can be a Peripheral Component Interconnect Express (PCIe) port or a physical port. Certain memory sub-systems can have multiple interface ports, such as two interface ports. Each interface port can have multiple (e.g., two) lanes that are used to receive and/or send data. Due to the architecture of certain memory devices, each interface port can transmit data at a different speed (i.e., rate). For example, an interface port can operate at a slower speed than another interface port.

In certain memory sub-systems, resources (e.g., memory access commands) can be allocated to each interface port using an arbitration method, such as a round robin arbitration method, without regard to the speed of the interface port. In a round robin arbitration method, memory access commands fetched from a host system can be allocated (e.g., sent) to each interface port in consecutive order. For example, a first memory access command fetched from a host system can be allocated to a first interface port, a second (e.g., the next) memory access command fetched from the host system can be allocated to a second interface port, a third memory access command fetched from the host system can be allocated to the first interface port, a fourth memory access command fetched from the host system can be allocated to the second interface port, etc. When one interface port operates at a slower speed than the other interface port, the memory access commands that are allocated to the interface port operating at the slower speed are correspondingly processed at slower speeds than the memory access commands that are allocated to the interface port operating at the faster speed. As a result, the interface port operating at the faster speed needs to wait to process memory access commands that are allocated to it (e.g., remain idle) while the slower interface port processes its allocated memory access commands. The imbalance between the interface ports can affect system performance and quality of service (QoS) requirements imposed on certain memory devices.

Aspects of the present disclosure address the above and other deficiencies by balancing performance between interface ports in a memory sub-system. Implementing a balancing of performance between interface ports in a memory sub-system can be used to allocate resources (e.g., memory access commands) to each interface port by taking the speed of each interface port into account and using firmware to decide on the arbitration method for resource allocation, such as a weighted round robin arbitration method or a priority arbitration method, based on the speed of each interface port. More resources can be allocated to the interface port operating at the faster speed than to the interface port operating at the slower speed, thus maintaining the balance between the interface ports by having the faster interface port process more resources than the slower interface port.

To implement balancing performance between interface ports in a memory sub-system as described herein, a memory sub-system controller can detect a triggering event that occurs at an interface port of the memory sub-system. In some embodiments, the triggering event can be a reduced power mode and/or low power mode of the interface port and/or the memory device. Detecting the triggering event can include receiving a message from a host system that indicates that the interface port and/or memory device is to be switched to a reduced power mode and/or low power mode. In some embodiments, the triggering event can be an idle interface port (e.g., the interface port is not receiving and/or processing any memory access commands). Detecting the triggering event can include determining that a counter associated with the interface port satisfies a threshold criterion. The counter can be maintained as a data structure (e.g., a table) to track a number of memory access commands received at the interface port. Satisfying the threshold criterion can include determining that the counter is a minimum (e.g., 0) number of memory access commands received at the interface port. In some embodiments, the triggering event can be an interface port operating at a slower speed. Detecting the triggering event can include identifying a decrease in a speed of the interface port and determining that the decrease in the speed satisfies a threshold criterion. Satisfying the threshold criterion can include determining that the decrease in speed is greater than or equal to a threshold speed decrease value.

In response to detecting the triggering event, the memory sub-system controller can send an interrupt message to a firmware component of the memory device. In some embodiments, the interrupt message can include data referencing the triggering event detected at the interface port. In some embodiments, the firmware component can determine a configuration setting for the interface port based on the interrupt message. The configuration setting can include one or more instructions for allocating resources to each interface port of the memory device (e.g., the two interface ports). In some embodiments, determining the configuration setting can include identifying a current speed of a first interface port and identifying a current speed of a second interface port of the memory device. The firmware component can determine (e.g., compute) a speed ratio between the current speed of the first interface port and the current speed of the second interface port. For example, the firmware component can identify that the first interface port has a current speed of 2 GB/s. The firmware component can identify that the second interface port has a current speed of 4 GB/s. The firmware component can compute the speed ratio between the current speed of the first interface port and the current speed of the second interface port by dividing the current speeds (e.g., 2 divided by 4=0.5). Thus, the firmware component can compute that the speed ratio is 0.5, indicating that the second interface port is twice as fast in terms of speed than the first interface port. The firmware component can determine an allocation of resources to one or each of the interface ports based on the speed ratio. For example, the firmware component can determine that twice as many resources should be allocated to the interface port with the faster speed. In one example, the firmware component can determine that, instead of allocating the resources using a round robin arbitration method, the resources can be allocated to each interface port using a weighted round robin arbitration method, where the faster interface port is assigned a greater weight corresponding to the speed ratio (e.g., 0.5 times more weight). In another example, the firmware component can determine that, instead of allocating the resources using a round robin arbitration method, the resources can be allocated to each interface port using a priority arbitration method, where the faster interface port is assigned a higher priority and/or the slower interface port is assigned a lower priority corresponding to the speed ratio. The firmware component can send the configuration setting including the one or more instructions for allocating the resources to each interface port to a hardware component of the memory device. In some embodiments, in response to receiving the configuration setting, the memory sub-system controller can allocate one or more resources to each interface port according to the configuration setting. Further details regarding implementing balancing performance between interface ports in a memory sub-system are described herein below with reference to FIGS. 2-3.

Advantages of the present disclosure include, but are not limited to, improved memory sub-system performance and improved QoS. For example, balancing performance between interface ports in a memory sub-system can improve system performance by taking into account the speed of each interface port and changing the arbitration method for resource allocation from round robin arbitration to another arbitration method, such as a weighted round robin arbitration method or a priority arbitration method, based on the speed of each interface port. More resources can be allocated to the interface port operating at the faster speed than to the interface port operating at the slower speed, thus maintaining the balance between the interface ports by having the faster interface port process more resources than the slower interface port and improving overall system performance and QoS.

Figure 1A:
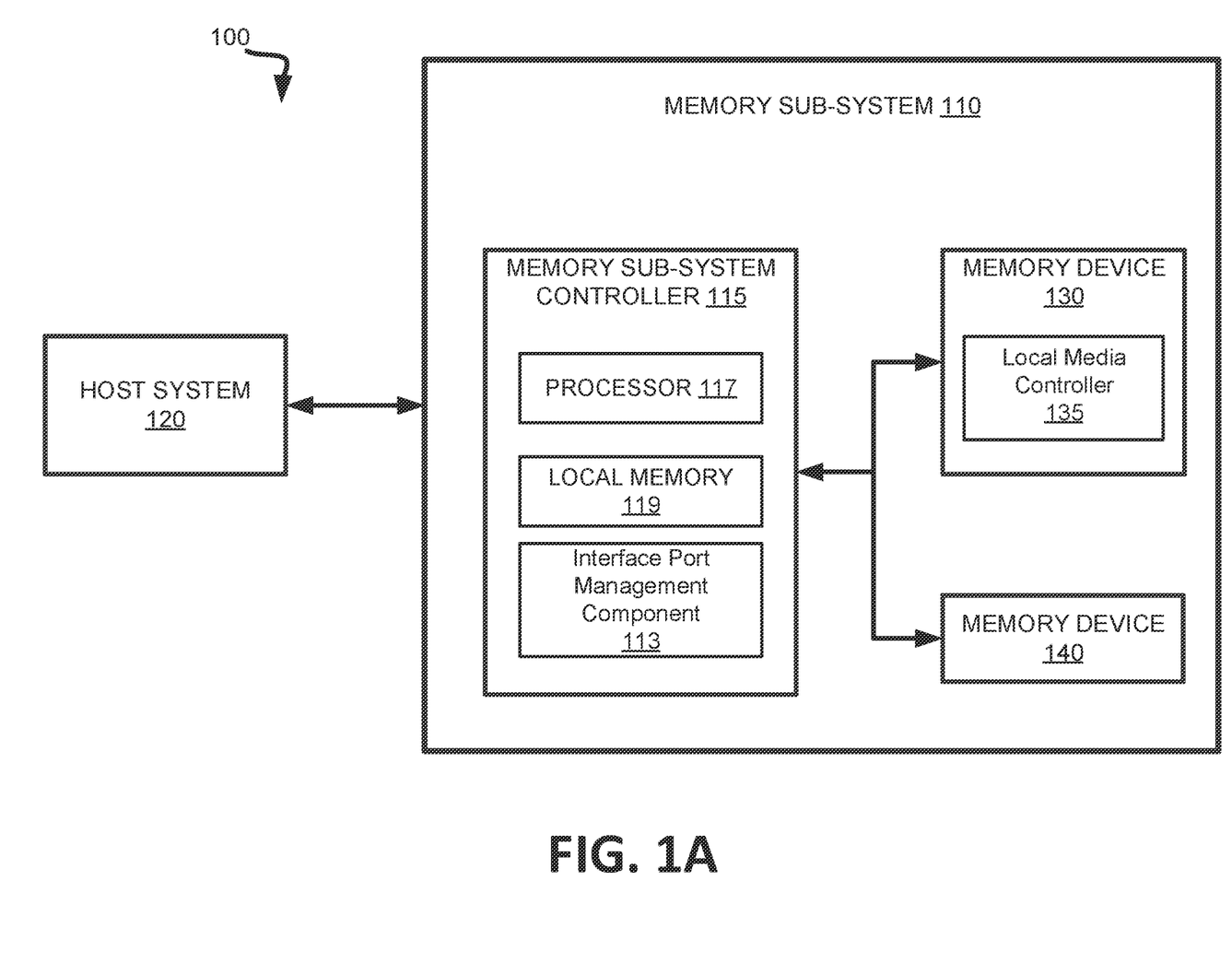
FIG. 1A illustrates an example computing system that includes a memory sub-system, in accordance with some embodiments of the present disclosure.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes an interface port management component 113 that can be used to implement balancing performance between interface ports in a memory sub-system, in accordance with embodiments of the present disclosure. In some embodiments, the memory sub-system controller 115 includes at least a portion of the interface port management component 113. In some embodiments, the interface port management component 113 is part of the host system 110, an application, or an operating system. In other embodiments, local media controller 135 includes at least a portion of interface port management component 113 and is configured to perform the functionality described herein.

In some embodiments, the interface port management component 113 can detect a triggering event that occurs at an interface port of the memory sub-system. In some embodiments, the triggering event can be a reduced power mode and/or low power mode of the interface port and/or the memory device. Detecting the triggering event can include receiving a message from a host system that indicates that the interface port and/or memory device is to be switched to a reduced power mode and/or low power mode. In some embodiments, the triggering event can be an idle interface port (e.g., the interface port is not receiving and/or processing any memory access commands). Detecting the triggering event can include determining that a counter associated with the interface port satisfies a threshold criterion. The counter can be maintained as a data structure (e.g., a table) to track a number of memory access commands received at the interface port. Satisfying the threshold criterion can include determining that the counter is a minimum (e.g., 0) number of memory access commands received at the interface port. In some embodiments, the triggering event can be an interface port operating at a slower speed. Detecting the triggering event can include identifying a decrease in a speed of the interface port and determining that the decrease in the speed satisfies a threshold criterion. Satisfying the threshold criterion can include determining that the decrease in speed is greater than or equal to a threshold speed decrease value.

In response to detecting the triggering event, the interface port management component 113 can send an interrupt message to a firmware component of the memory device. In some embodiments, the interrupt message can include data referencing the triggering event detected at the interface port. In some embodiments, the firmware component can determine a configuration setting for the interface port based on the interrupt message. The configuration setting can include one or more instructions for allocating resources to each interface port of the memory device (e.g., the two interface ports). In some embodiments, determining the configuration setting can include identifying a current speed of a first interface port and identifying a current speed of a second interface port of the memory device. The firmware component can determine (e.g., compute) a speed ratio between the current speed of the first interface port and the current speed of the second interface port. For example, the firmware component can identify that the first interface port has a current speed of 2 GB/s. The firmware component can identify that the second interface port has a current speed of 4 GB/s. The firmware component can compute the speed ratio between the current speed of the first interface port and the current speed of the second interface port by dividing the current speeds (e.g., 2 divided by 4=0.5). Thus, the firmware component can compute that the speed ratio is 0.5, indicating that the second interface port is twice as fast in terms of speed than the first interface port. The firmware component can determine an allocation of resources to one or each of the interface ports based on the speed ratio. For example, the firmware component can determine that twice as many resources should be allocated to the interface port with the faster speed. In one example, the firmware component can determine that, instead of allocating the resources using a round robin arbitration method, the resources can be allocated to each interface port using a weighted round robin arbitration method, where the faster interface port is assigned a greater weight corresponding to the speed ratio (e.g., 0.5 times more weight). In another example, the firmware component can determine that, instead of allocating the resources using a round robin arbitration method, the resources can be allocated to each interface port using a priority arbitration method, where the faster interface port is assigned a higher priority and/or the slower interface port is assigned a lower priority corresponding to the speed ratio. The firmware component can send the configuration setting including the one or more instructions for allocating the resources to each interface port to a hardware component of the memory device. In some embodiments, in response to receiving the configuration setting, the interface port management component 113 can allocate one or more resources to each interface port according to the configuration setting. Further details regarding implementing balancing performance between interface ports in a memory sub-system are described herein below with reference to FIGS. 2-3.

It will be appreciated by those skilled in the art that additional circuitry and signals can be provided, and that the components of FIG. 1A have been simplified. It should be recognized that the functionality of the various block components described with reference to FIG. 1A may not necessarily be segregated to distinct components or component portions of an integrated circuit device. For example, a single component or component portion of an integrated circuit device could be adapted to perform the functionality of more than one block component of FIG. 1A. Alternatively, one or more components or component portions of an integrated circuit device could be combined to perform the functionality of a single block component of FIG. 1A.

Figure 1B:
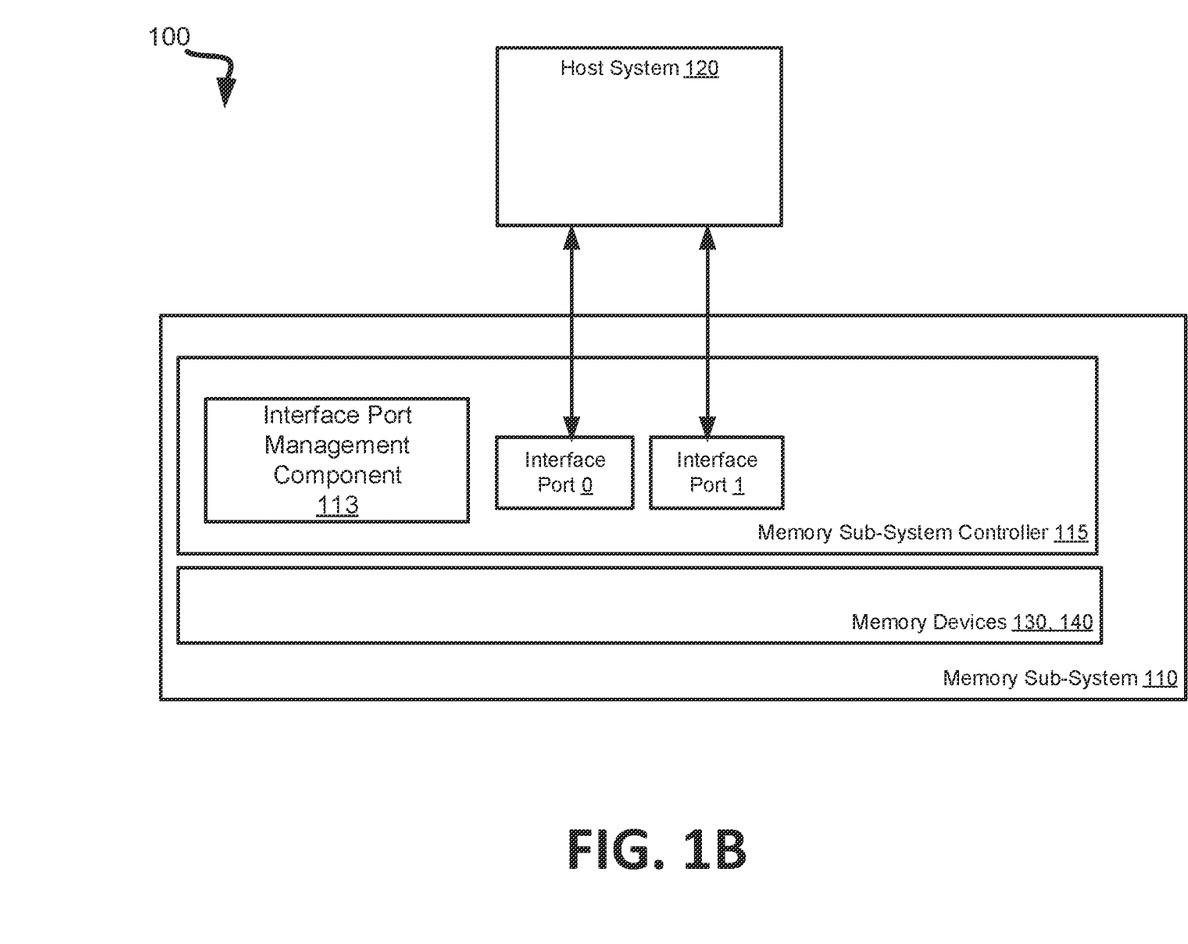
FIG. 1B illustrates the example computing system of FIG. 1A with a set of interface ports, in accordance with some embodiments of the present disclosure.

FIG. 1B illustrates the example computing system of FIG. 1A with a set of interface ports, in accordance with some embodiments of the present disclosure. As illustrated in FIG. 1B, the host system 120 can be coupled to the memory sub-system 110 via an interface port. Examples of interface ports include a serial advanced technology attachment (SATA) interface, a peripheral component interconnect express (PCIe) interface, universal serial bus (USB) interface, Fibre Channel, Serial Attached SCSI (SAS), etc. The interface port can be used to transmit data between the host system 120 and the memory sub-system 110. The host system 120 can further utilize an NVM Express (NVMe) interface to access the memory sub-system controller 115 (e.g., memory devices 130, 140) when the memory sub-system 110 is coupled with the host system 120 by the PCIe interface. The interface port can provide an interface for passing control, address, data, and other signals between the memory sub-system 110 and the host system 120. The memory sub-system 110 can include multiple interface ports, such as an interface port 0 and an interface port 1. Each interface port can have multiple lanes, such as two lanes. Each interface port can operate (e.g., receive and/or process memory access commands) at independent speeds. In some embodiments, each lane of each interface port can operate at independent speeds. Further details regarding interface ports in a memory sub-system are described herein below with reference to FIGS. 2-3.

Figure 2:
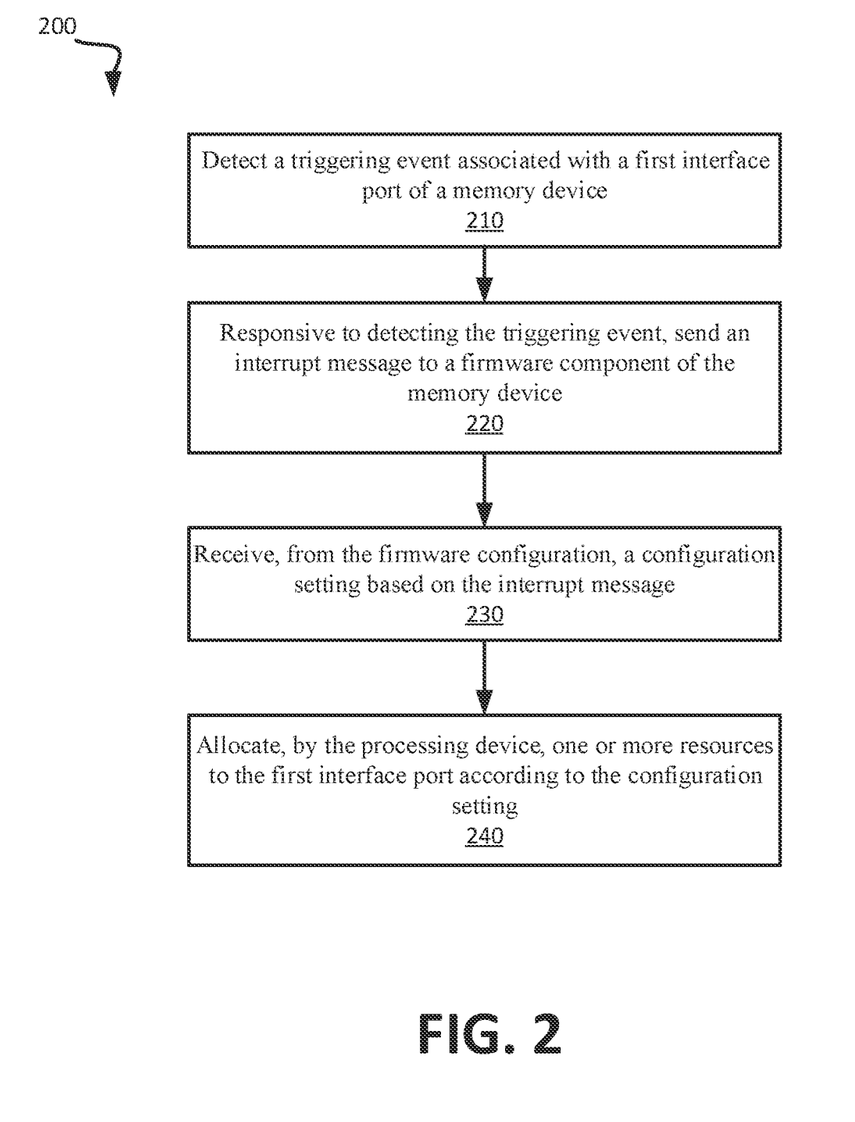
FIG. 2 is a flow diagram illustrating an example of a method to implement balancing performance between interface ports in a memory sub-system, in accordance with some embodiments of the present disclosure.

FIG. 2 is a flow diagram illustrating an example of a method 200 to implement balancing performance between interface ports in a memory sub-system, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the interface port management component 113 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic detects a triggering event associated with an interface port (e.g., the interface port 0 and/or interface port 1 of FIG. 1B) of a memory device, such as memory device 130 of FIG. 1A. In some embodiments, detecting the triggering event can include receiving a message at a memory sub-system controller (e.g., the memory sub-system controller 115 of FIG. 1A) from a host device (e.g., the host system 120 of FIG. 1A). The message can include a status update of a power mode of the interface port and/or the memory device. In some embodiments, the message can indicate that the interface port and/or the memory device is operating at a reduced power mode and/or low power mode. In some embodiments, the message can indicate that the interface port and/or the memory device is to be switched to a reduced power mode and/or low power mode.

In some embodiments, detecting the triggering event can include identifying a counter associated with the interface port. The counter can be maintained (e.g., stored) in a data structure of a memory device (e.g., the memory device 130 of FIG. 1A). The counter can be associated with the interface port. In some embodiments, the counter can be used to track a number of memory access commands received at the interface port from, e.g., the host device. In some embodiments, the counter can increment by an integer value (e.g., 1) for each memory access command received at the interface port. The counter can decrement by an integer value (e.g., 1) for each memory access command processed at the interface port. Detecting the triggering event can include determining that the counter satisfies a threshold criterion. In some embodiments, satisfying the threshold criterion can include determining that the counter is at a minimum value (e.g., 0) of memory access commands received at the interface port.

In some embodiments, detecting the triggering event can include identifying a decrease in a current speed of the interface port. The processing logic can determine that the decrease in the speed of the interface port satisfies a threshold criterion. In some embodiments, satisfying the threshold criterion can include determining that the decrease in speed of the interface port is greater than or equal to a threshold value. The threshold value can be a threshold speed decrease value (e.g., 2 GB/s).

At operation 220, the processing logic sends an interrupt message to a firmware component of the memory device. In some embodiments, the processing logic sends the interrupt message to the firmware component in response to detecting the triggering event at operation 210. In some embodiments, the interrupt message can include data referencing the triggering event detected at the interface port. For example, the interrupt message can include the current speed of each interface port of the memory device. In some embodiments, the interrupt message is an electrical signal that interrupts the firmware component. In some embodiments, the interrupt message can be sent using an interrupt routine.

At operation 230, the processing logic receives a configuration setting from the firmware component. The configuration setting can be one or more instructions for allocating one or more resources to the interface port. In some embodiments, the configuration setting can be based on the interrupt message sent to the firmware component. In some embodiments, the one or more instructions for allocating the one or more resources to the interface port can include using a certain arbitration method. For example, the one or more resources to the interface port can include using a weighted round robin arbitration method. In some embodiments, the one or more instructions for allocating the one or more resources to the interface port can include using a priority arbitration method. In some embodiments, receiving the configuration setting can include accessing one or more registers of the memory device, where the configuration setting is stored by the firmware component in the one or more registers using an internal bus coupled to the memory device.

At operation 240, the processing logic allocates one or more resources to the interface port. In some embodiments, the processing logic allocates the one or more resources to the interface port in accordance with the configuration setting received at operation 230. For example, the processing logic can identify the arbitration method referenced in the one or more instructions of the configuration setting. The processing logic can allocate the one or more resources to the interface port using the identified arbitration method. In some embodiments, the processing logic uses the identified arbitration method until receiving another configuration setting from the firmware component with another arbitration method. In some embodiments, the processing logic uses the identified arbitration method for a threshold period of time. In some embodiments, the firmware component can identify the threshold period of time in the configuration setting. In some embodiments, the threshold period of time is preconfigured at manufacturing of the memory device and stored in a data structure associated with the memory device.

Figure 3:
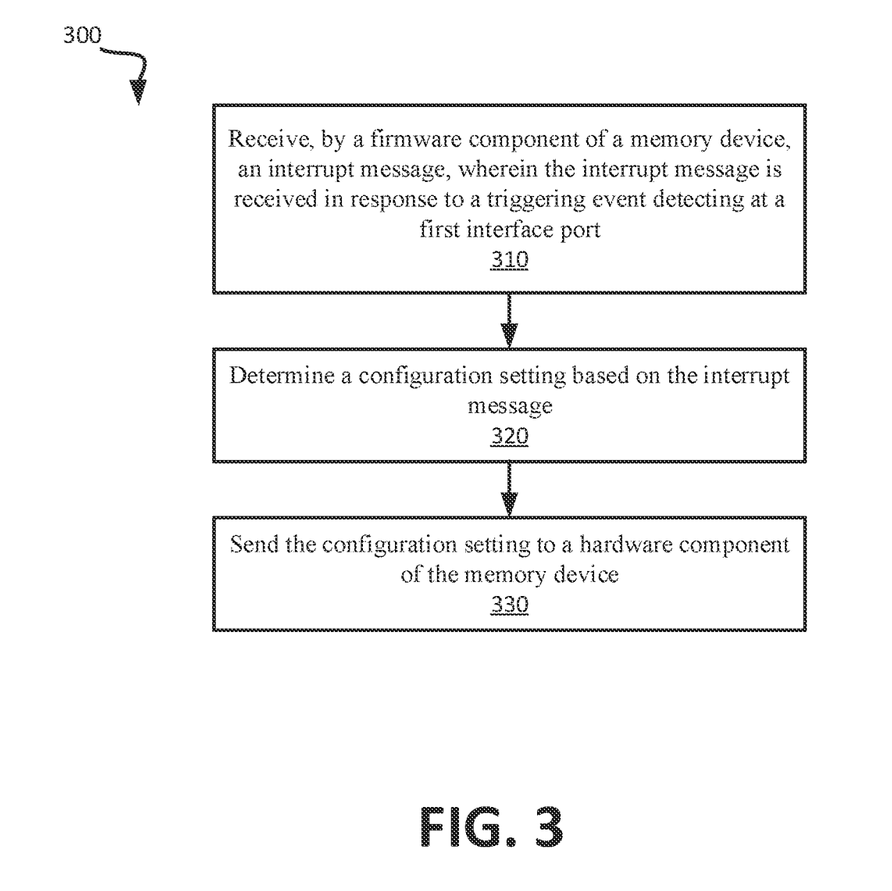
FIG. 3 is a flow diagram illustrating an example of a method to implement balancing performance between interface ports in a memory sub-system, in accordance with some embodiments of the present disclosure.

FIG. 3 is a flow diagram of an example method 300 to implement balancing performance between interface ports in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the interface port management component 113 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives an interrupt message. In some embodiments, the interrupt message is received by a firmware component of a memory device, such as memory device 130 of FIG. 1A. In some embodiments, the interrupt message is received from a hardware component of the memory device in response to detecting a triggering event at an interface port (e.g., the interface port 0 and/or interface port 1 of FIG. 1B) of the memory device.

In some embodiments, detecting the triggering event can include receiving a message at a memory sub-system controller (e.g., the memory sub-system controller 115 of FIG. 1A) from a host device (e.g., the host system 120 of FIG. 1A). The message can include a status update of a power mode of the interface port and/or the memory device. In some embodiments, the message can indicate that the interface port and/or the memory device is operating at a reduced power mode and/or low power mode. In some embodiments, the message can indicate that the interface port and/or the memory device is to be switched to a reduced power mode and/or low power mode.

In some embodiments, detecting the triggering event can include identifying a counter associated with the interface port. The counter can be maintained (e.g., stored) in a data structure of a memory device (e.g., the memory device 130 of FIG. 1A). The counter can be associated with the interface port. In some embodiments, the counter can be used to track a number of memory access commands received at the interface port from, e.g., the host device. In some embodiments, the counter can increment by an integer value (e.g., 1) for each memory access command received at the interface port. The counter can decrement by an integer value (e.g., 1) for each memory access command processed at the interface port. Detecting the triggering event can include determining that the counter satisfies a threshold criterion. In some embodiments, satisfying the threshold criterion can include determining that the counter is at a minimum value (e.g., 0) of memory access commands received at the interface port.

In some embodiments, detecting the triggering event can include identifying a decrease in a current speed of the interface port. The processing logic can determine that the decrease in the speed of the interface port satisfies a threshold criterion. In some embodiments, satisfying the threshold criterion can include determining that the decrease in speed of the interface port is greater than or equal to a threshold value. The threshold value can be a threshold speed decrease value (e.g., 2 GB/s).

At operation 320, the processing logic (e.g., the firmware component) determines a configuration setting based on the interrupt message received at operation 310. The configuration setting can include one or more instructions for allocating resources to each interface port of the memory device. In some embodiments, the one or more instructions for allocating the one or more resources to the interface port can include using a certain arbitration method. For example, the one or more resources to the interface port can include using a weighted round robin arbitration method. In some embodiments, the one or more instructions for allocating the one or more resources to the interface port can include using a priority arbitration method. In some embodiments, determining the configuration setting can include identifying a current speed of a first interface port (e.g., the interface port 0 of FIG. 1B) and identifying a current speed of a second interface port (e.g., the interface port 1 of FIG. 1B). The firmware component can compute a speed ratio between the current speed of the first interface port and the current speed of the second interface port. For example, the processing logic can identify that the first interface port has a current speed of 2 GB/s. The processing logic can identify that the second interface port has a current speed of 4 GB/s. The processing logic can compute the speed ratio between the current speed of the first interface port and the current speed of the second interface port by dividing the current speeds (e.g., 2 divided by 4=0.5). The processing logic can determine an allocation of resources to each of the interface ports based on the speed ratio. In one example, the processing logic can determine that, instead of allocating the resources using a round robin arbitration method, the resources can be allocated to each interface port using a weighted round robin arbitration method, where the faster interface port is assigned a greater weight corresponding to the speed ratio (e.g., 0.5 times more weight). In another example, the processing logic can determine that, instead of allocating the resources using a round robin arbitration method, the resources can be allocated to each interface port using a priority arbitration method, where the faster interface port is assigned a higher priority and/or the slower interface port is assigned a lower priority corresponding to the speed ratio.

At operation 330, the processing logic sends the configuration setting to a hardware component of the memory device. In some embodiments, sending the configuration setting to the hardware component can include storing the configuration setting in one or more registers of the memory device. Storing the configuration setting can include communicating with the one or more registers using an internal bus. In some embodiments, the one or more registers are accessible by the hardware component of the memory device. In some embodiments, the hardware component can allocate one or more resources to the interface port in accordance with the configuration setting, as described with reference to FIG. 2.

Figure 4:
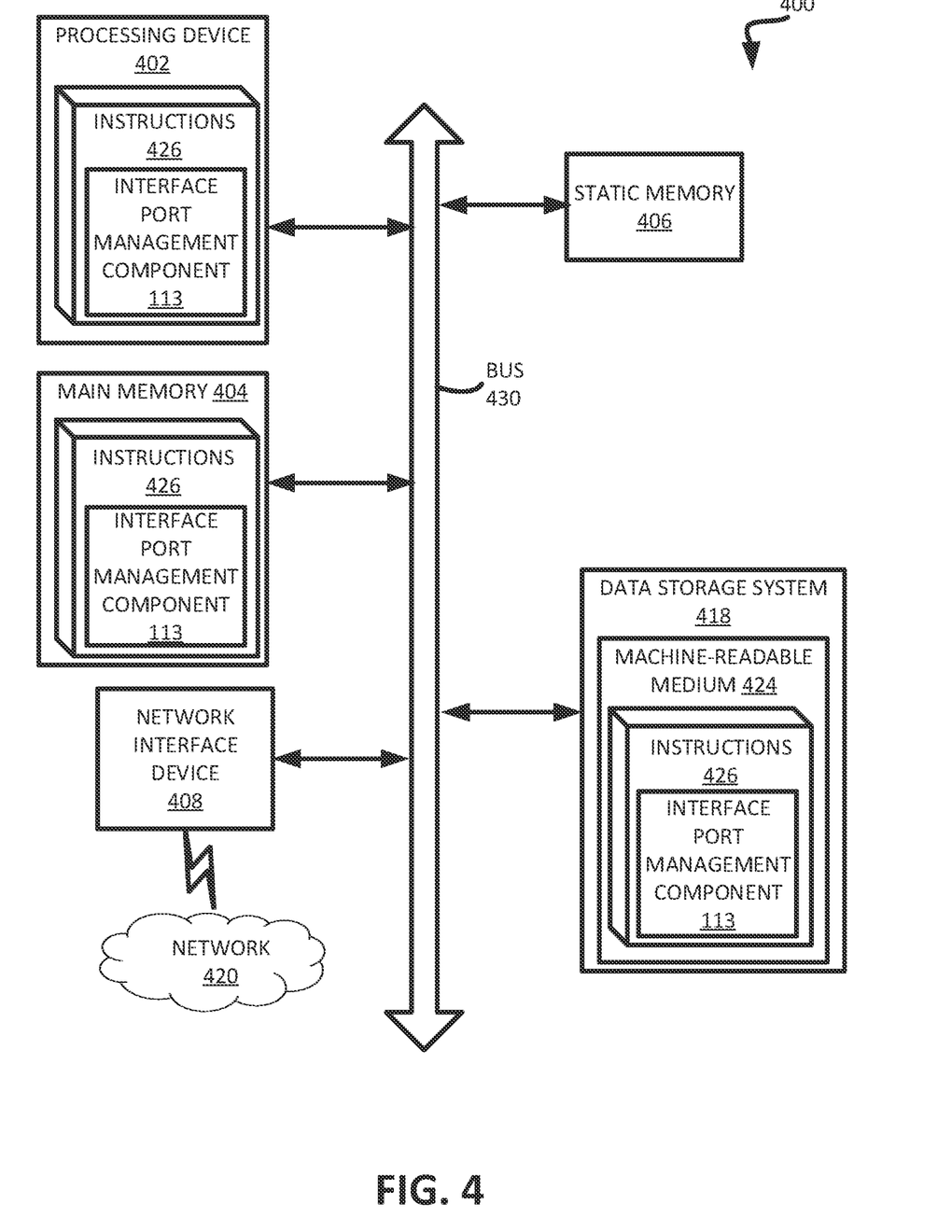
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the adaptive parameter component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1A.

In one embodiment, the instructions 426 include instructions to implement functionality corresponding to a component (e.g., interface port management component 113 of FIG. 1A). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device;
   a first interface port and a second interface port operatively coupled with the memory device; and
   a processing device, operatively coupled with the memory device, to perform operations comprising:
   detecting a triggering event associated with the first interface port;
   responsive to detecting the triggering event, sending an interrupt message to a firmware component of the memory device;
   receiving, from the firmware component, a configuration setting based on the interrupt message, wherein the configuration setting comprises one or more instructions referencing (i) an arbitration method for allocating one or more resources to the first interface port and (ii) a threshold period of time for using the arbitration method;
   identifying the arbitration method and the threshold period of time referenced in the one or more instructions of the configuration setting; and
   allocating, by the processing device, the one or more resources to the first interface port according to the identified arbitration method for the threshold period of time;
   wherein the one or more resources include memory access commands.

2. The system of claim 1, wherein to detect the triggering event associated with the first interface port, the processing device is to perform operations further comprising:
   receiving a message from a host system connected to the first interface port, wherein the message indicates a reduced power mode at the first interface port.

3. The system of claim 1, wherein to detect the triggering event associated with the first interface port, the processing device is to perform operations further comprising:
   determining that a counter associated with the first interface port satisfies a threshold criterion, wherein the counter references a number of memory access commands received at the first interface port.

4. The system of claim 1, wherein to detect the triggering event associated with the first interface port, the processing device is to perform operations further comprising:
   identifying a decrease in a speed associated with the first interface port; and
   determining that the decrease in the speed associated with the first interface port satisfies a threshold criterion.

5. The system of claim 1, wherein to receive the configuration setting, the processing device is to perform operations further comprising:
   accessing the configuration setting stored in one or more registers associated with the memory device, wherein the configuration setting is stored, by the firmware component, in the one or more registers via an internal bus.

6. The system of claim 1, wherein the configuration setting comprises an instruction to allocate the one or more resources to the first interface port using a weighted round robin arbitration.

7. The system of claim 1, wherein the configuration setting comprises an instruction to allocate the one or more resources to the first interface port using a priority arbitration.

8. A method comprising:
   receiving, by a firmware component of a memory device, an interrupt message, wherein the interrupt message is received in response to a triggering event detected at a first interface port, wherein the memory device is operatively coupled with the first interface port and a second interface port;
   determining a configuration setting based on the interrupt message, wherein the configuration setting comprises one or more instructions referencing (i) an arbitration method for allocating one or more resources to the first interface port and (ii) a threshold period of time for using the arbitration method;
   identifying the arbitration method and the threshold period of time referenced in the one or more instructions of the configuration setting; and
   sending the configuration setting to a hardware component of the memory device, wherein the one or more resources is to be allocated to the first interface port according to the identified arbitration method for the threshold period of time;
   wherein the one or more resources include memory access commands.

9. The method of claim 8, wherein sending the configuration setting to the hardware component of the memory device comprises storing the configuration setting in one or more registers associated with the memory device via an internal bus.

10. The method of claim 8, wherein the triggering event detected at the first interface port of the memory device comprises a reduced power mode at the interface port.

11. The method of claim 8, wherein the triggering event detected at the first interface port of the memory device comprises a threshold decrease in speed associated with the interface port.

12. The method of claim 8, wherein determining the configuration setting based on the interrupt message further comprises:
    identifying a current first speed of the first interface port;
    identifying a current second speed of the second interface port;
    determining a speed ratio between the first interface port and the second interface port based on the current first speed of the first interface port and the current second speed of the second interface port; and
    determining an allocation of the one or more resources to the first interface port based on the speed ratio.

13. The method of claim 12, wherein the determined allocation of the one or more resources to the first interface port is a weighted round robin arbitration.

14. The method of claim 12, wherein the determined allocation of the one or more resources to the first interface port is a priority arbitration.

15. A non-transitory computer-readable storage medium comprising instructions that, when executed by a processing device, cause the processing device to perform operations comprising:
- detecting a triggering event associated with a first interface port, wherein a memory device is operatively coupled to the first interface port and a second interface port;
- responsive to detecting the triggering event, sending an interrupt message to a firmware component of the memory device;
- receiving, from the firmware component, a configuration setting based on the interrupt message, wherein the configuration setting comprises one or more instructions referencing (i) an arbitration method for allocating one or more resources to the first interface port and (ii) a threshold period of time for using the arbitration method;
- identifying the arbitration method and the threshold period of time referenced in the one or more instructions of the configuration setting; and
- allocating, by the processing device, the one or more resources to the first interface port according to the identified arbitration method for the threshold period of time;
- wherein the one or more resources include memory access commands.

16. The non-transitory computer-readable storage medium of claim 15, wherein to detect the triggering event associated with the first interface port, the processing device is to perform operations further comprising:
- receiving a message from a host system connected to the first interface port, wherein the message indicates a reduced power mode at the first interface port.

17. The non-transitory computer-readable storage medium of claim 15, wherein to detect the triggering event associated with the first interface port, the processing device is to perform operations further comprising:
- determining that a counter associated with the first interface port satisfies a threshold criterion, wherein the counter references a number of memory access commands received at the first interface port.

18. The non-transitory computer-readable storage medium of claim 15, wherein to detect the triggering event associated with the first interface port, the processing device is to perform operations further comprising:
- identifying a decrease in a speed associated with the first interface port; and determining that the decrease in the speed associated with the first interface port satisfies a threshold criterion.

19. The non-transitory computer-readable storage medium of claim 15, wherein to receive the configuration setting, the processing device is to perform operations further comprising:
- accessing the configuration setting stored in one or more registers associated with the memory device, wherein the configuration setting is stored, by the firmware component, in the one or more registers via an internal bus.

20. The non-transitory computer-readable storage medium of claim 15, wherein the configuration setting comprises an instruction to allocate the one or more resources to the first interface port using a priority arbitration.

* * * * *